(12) United States Patent
Cortés et al.

(10) Patent No.: US 9,166,508 B2
(45) Date of Patent: Oct. 20, 2015

(54) SYNCHRONOUS POWER CONTROLLER FOR A GENERATING SYSTEM BASED ON STATIC POWER CONVERTERS

(75) Inventors: Pedro Rodriguez Cortés, Seville (ES); José Ignacio Candela Garcia, Seville (ES); Joan Rocabert Delgado, Seville (ES); Remus Teodorescu, Seville (ES)

(73) Assignee: Abengoa Solar New Technologies, S.A., Seville (ES)

( * ) Notice: Subject to any disclaimer, the term of this patent is extended or adjusted under 35 U.S.C. 154(b) by 104 days.

(21) Appl. No.: 14/001,839

(22) PCT Filed: Feb. 27, 2012

(86) PCT No.: PCT/ES2012/000046
§ 371 (c)(1),
(2), (4) Date: Oct. 29, 2013

(87) PCT Pub. No.: WO2012/117131
PCT Pub. Date: Sep. 7, 2012

(65) Prior Publication Data
US 2014/0049228 A1 Feb. 20, 2014

(30) Foreign Application Priority Data
Feb. 28, 2011 (ES) .................. 201100221

(51) Int. Cl.
*H02P 11/00* (2006.01)
*H02H 7/06* (2006.01)
*H02P 9/00* (2006.01)
*H02M 7/44* (2006.01)
(Continued)

(52) U.S. Cl.
CPC .. *H02P 9/00* (2013.01); *H02M 7/44* (2013.01)

(58) Field of Classification Search
USPC ......................... 322/24; 324/76.78; 341/157
See application file for complete search history.

(56) References Cited

U.S. PATENT DOCUMENTS 7,786,919 B2 * 8/2010 Parfitt ........................ 341/157
8,067,932 B2 * 11/2011 Teodorescu et al. ....... 324/76.78
8,994,363 B2 * 3/2015 Rodriguez et al. ......... 324/76.39

(Continued)

FOREIGN PATENT DOCUMENTS

WO 20101022766 3/2010
WO 20101055322 5/2010

OTHER PUBLICATIONS

Zhong, Q; Weiss, G; "Synchronverters: Inverters that Mimic Synchronous Generators" Industrial Electronics, IEEE Transactions on, vol.PP, No. 99, pp. 1, 2010.

(Continued)

*Primary Examiner* — Pedro J Cuevas
(74) *Attorney, Agent, or Firm* — Kilpatrick Townsend & Stockton LLP

(57) ABSTRACT

The invention relates to a synchronous power controller for a generation system based on static power converters, said controller comprising two main blocks referred to as: block 1 (electric block) (10) and block 2 (electromechanical block) (20), electric block 1 (10) being, in turn, formed by a virtual electrical characteristic controller (11) and a virtual admittance controller (12) and the electromechanical block 2 (20) being formed by a virtual electromechanical characteristic controller (21) and an inertia and damping factor controller (22).

8 Claims, 2 Drawing Sheets

(51) Int. Cl.
*G01R 25/00* (2006.01)
*H03M 1/60* (2006.01)

(56) References Cited

U.S. PATENT DOCUMENTS

| | | | |
|---|---|---|---|
| 9,002,529 B2* | 4/2015 | Ko et al. | 700/286 |
| 2007/0159265 A1* | 7/2007 | Weng et al. | 331/17 |
| 2009/0079612 A1* | 3/2009 | Parfitt | 341/157 |
| 2010/0213925 A1* | 8/2010 | Teodorescu et al. | 324/76.78 |
| 2010/0256970 A1 | 10/2010 | Heese | 703/18 |
| 2014/0015250 A1* | 1/2014 | Teodorescu et al. | 290/44 |
| 2014/0049233 A1* | 2/2014 | Rodriguez Cortes et al. | 323/234 |
| 2014/0067138 A1* | 3/2014 | Rodriguez Cortes et al. | 700/286 |
| 2015/0123625 A1* | 5/2015 | Haugan | 322/24 |

OTHER PUBLICATIONS

Lidong Zhang, et al. "Power-Synchronization Control of Grid-Connected Voltage-Source Converters" Power Systems, IEEE Transactions on, vol. 25, No. 2, pp. 809-820, May 2010.

J. M. Guerrero, et a. "Hierarchical Control of Droop-Controlled AC and DC Microgrids—A General Approach Towards Standardization" IEEE Trans Ind Electronics, 2010.

De Brabandere, K.; "Voltage and frequency droop control in low voltage grids by distributed generators with inverter front-end"; Doctoral Thesis, Leuven, België, Oct. 2006, ISBN 90-5682-745-6.

ISR for related PCT/ES2012/000046 mailed on Jun. 26, 2012 and its English translation.

IPRP for related PCT/ES2012/000046 issued on Sep. 3, 2013 and its English translation.

Ruiz, A P, et al. A novel integrated renewable energy system modelling approach, allowing fast FPGA controller prototyping. Optimization of Electrical and Electronic Equipment, 2008. OPTIM 2008. 11th International Conference. May 22, 2008. p. 395-400 ISBN 978-1-4244-1544-1; ISBN 1-4244-1544-6.

Timbus A V, et al. Adaptive Resonant Controller for Grid-Connected Converters in Distributed Power Generation Systems. Applied Power Electronics Conference and Exposition, 2006. APEC '06. Twenty-First Annual IEEE Mar. 19, 2006. p. 1601-1606. ISBN 978-0-7803-9547-3; ISBN 0-7803-9547-6.

Third Party Observation as filed in Corresponding PCT Application PCT/ES2012/000046, mailed on Jul. 1, 2013, 3 pages.

Guerrero, Josep M., Vasquez, Juan C., Matas, Jose, Castilla, Miguel, Garcia de Vicuna, Luiz, "Control Strategy for Flexible Micro grid Based on Parallel Line-Interactive UPS Systems." IEEE Transactions on Industrials Electronics, vol. 56, No. 3, Mar. 2009, 11 pages.

Report on the State of the Art in Spanish Application 2011/00221, mailed on Mar. 22, 2013, 4 pages.

* cited by examiner

US 9,166,508 B2

SYNCHRONOUS POWER CONTROLLER FOR A GENERATING SYSTEM BASED ON STATIC POWER CONVERTERS

CROSS-REFERENCE TO RELATED APPLICATIONS

This application is the U.S. National Phase of International Patent Application No. PCT/ES2012/000046, filed on Feb. 27, 2012, which claims priority to Spanish Patent Application No. P201100221 filed on Feb. 28, 2011, the disclosures of which are hereby incorporated by reference in their entireties.

TECHNICAL SECTOR OF THE INVENTION

The invention belongs to the technical sector of power controllers for renewable energy plants, especially useful in photovoltaic generation plants, which allows offering advanced functionalities to improve the connection of said plants to the electric grid.

BACKGROUND OF THE INVENTION

The sources of renewable energy, mainly wind power plants (WIN) and photovoltaic (PH) power plants, have ceased to be a marginal resource in the generation of electricity.

The generators of PH plants use power converters to connect to the electric grid. These power converters, also known as inverters, inject current to the voltage of the grid to supply power to the same.

In normal operating conditions, the PH inverters inject single-phase or tri-phase sinusoidal currents to the grid, depending on the power range of the generator. Normally, the currents injected to the grid tend to be sinusoidal and are in phase with the voltages of the coupling point to maximize the amount of active power being generated. There are no PH inverters in the market, at least in on a generalized basis, that inject currents to the quadrature with the grid voltages, which allows controlling the reactive power injected to the grid with the purpose of regulating the voltage level at the coupling point. When the grid voltage is affected by a perturbation, such as imbalances, transients, or harmonics, which is usual in electric grids, conventional PH inverters experience problems to remain appropriately synchronized with the grid voltage, which leads to uncontrolled power flows that cause the PH inverter to worsen the situation of the failure of the grid. With more serious grid perturbations, such as voltage dips, short-circuits, or power oscillations, conventional PH inverters cannot offer an appropriate support to the electric grid to help maintain the generation system active. In fact, these serious transient perturbations usually cause the disconnection of the grid in the majority of the commercial PH inverters due to the triggering of some of its overcurrent or overvoltage protections. The problem caused by this type of errant behavior in conventional PH generation systems is more marked in weak grids or in grids with a high percentage of PH plants installed, which renders them unstable.

A scenario as the one described above does not offer reliability to power system operators—internationally known as TSO (Transmission System Operator), which forces them to plan and provide active and reactive power reserves to the grid by means of conventional synchronous generation or other mechanisms, to decrease the risk of the collapse of the electric system.

For obvious reasons, these power reserves are not free, which implies an additional economic burden associated with the increase in the penetration of PH generation plants.

In order to face this situation of instability, TSOs worldwide are increasingly becoming more demanding with respect to the features offered by renewable energy-based distributed generation plants. These requirements are materialized in the so-called grid codes. These types of codes are usually applied to generation technologies with a significant presence in the electric system. A clear example is the strict grid connection codes applied to wind generation systems, the PH systems being the next candidates to be regulated by these types of codes. By means of the strict requirements stipulated in the grid codes, TSOs intend for PH plants to increase their functionality and reliability with the purpose of avoiding having to pay third parties for auxiliary services that allow guaranteeing the stability of the electric system. In this case, the manufacturers and developers of PH systems are in charge of modernizing their technology to contribute the required systems, which will ultimately allow increasing the penetration of the PH energy systems in the electric grids in the following decade.

Part of the research lines found in the state of the art to improve the connection of static power converters to the grid, by authors such as Qing-Chang Zhong and Lenart Harnefors, are based on observing the operating principle of a synchronous generator and replicating it by means of the use of a static power converter.

A series of selected articles from these authors is listed below:

- Zhong, Q; Weiss, G; "Synchronverters: Inverters that Mimic Synchronous Generators," Industrial Electronics, IEEE Transactions on, vol. PP, no. 99, pp. 1, 2010.
- Weiss, G.; Qing-Chang Zhong; "Static synchronous generators"; Patent, PCT/GB20091051460; WO 20101055322 A2. International Filing Date: 12 Nov. 2008.
- Harnefors, L.; "Control of a voltage source converter using synchronous machine emulation"; Patent, PCT/EP20081061147; WO 20101022766 A1. International Filing Date: 26 Aug. 2008.
- Lidong Zhang; Harnefors, L.; Nee, H.-P.; "Power-Synchronization Control of Grid-Connected Voltage-Source Converters," Power Systems, IEEE Transactions on, vol. 25, no. 2, pp. 809-820, May 2010.

Other authors, such as Josep M. Guerrero or Karel de Brabandere implement active and reactive power controllers for applications wherein the distributed power converters constitute small low-voltage grids, such as the case of microgrids supplied by multiple uninterrupted supply systems. These controllers are characterized in that they establish the voltage reference of the power converters. Some representative articles by these authors are the following:

- J. M. Guerrero, J. C. Vasquez, J. Matas, L. Garcia de Vicuña, and M. Castilla, "Hierarchical Control of Droop—Controlled AC and DC Microgrids—A General Approach Towards Standardization," IEEE Trans Ind Electronics, 2010.
- De Brabandere, K.; "Voltage and frequency droop control in low voltage grids by distributed generators with inverter front-end"; Doctoral Thesis, Leuven, België, October 2006, ISBN 90-5682-745-6.

In terms of the patents applied for, international application WO2010055322(A2) by Weiss George [IL]; Zhong Qing-Chang [GB], can be considered as the closest to the invention object of this patent, given that it relates to a controller that faithfully emulates the behavior of a conventional synchronous generator.

The majority of the research papers mentioned above detect a series of problems derived from the attempt to faithfully replicate the operation of a conventional synchronous generator, without intending to solve its inherent inconveniences, among which we have the instability inherent to the synchronous generator, the difficulty in maintaining the synchronism during failures, or the appearance of resonance with other elements of the grid.

In this sense, the invention object of this patent supposes a solution to the problems represented by commercial inverters and conventional renewable power plants when they operate under generic conditions in the electric grid by offering the following:

- Optimized response in the case of a drop/rise in the frequency of the grid, by controlling the delivered/received active power such that it limits said variation.
- Optimized response in the case of a drop/rise in the effective voltage, by controlling the inductive/capacitive reactive power such that it limits said variation.
- Optimized response in the case of the perturbation generated by the increase/reduction of nearby charges, supporting their supply by means of a point increase/reduction of the current injected to the grid.
- Optimized response in the case of a distortion in the form of a voltage wave, affected by harmonics, transients, or imbalances, offering voltage/current conditioning functions that minimize and damp said perturbations.
- Optimized response in the case of oscillations in the frequency and active power of the system, offering damping functions that minimize said oscillations in the electric system.

DESCRIPTION OF THE INVENTION

The Synchronous Power Controller of a generating system based on static power converters being claimed is a new concept in the control of latest generation renewable power plants that allows offering advanced functionalities to improve the integration of said plants to the electric grid.

Among the main characteristics of a plant based on this controller we have the following:

- The capacity of electronically implementing an advanced synchronous generation system, improving the behavior of conventional generators, which operation is not based in the effectiveness of the synchronization algorithm with the grid voltage, but it is capable of achieving a 'natural synchronization' with other generators of the electric grid by means of a weighted and controlled power exchange.
- The capacity of interacting with the electric grid in a beneficial manner for the same, regardless of the grid type (High Voltage or Low Voltage), of the short-circuit power of the same, or of the R/X characteristic at the connecting point.
- The capacity of providing, in a natural manner, support services to the electric grid in the case of perturbations in the same, by implementing the controllers that supply the auxiliary services required by the TSO to guarantee the stability of the grid.
- The capacity of maintaining multiple generators working in parallel, connected to the main grid or by forming intentional islands disconnected from the same, both in a stable operating system and in the case of grid perturbations, and by distributing the services supplied by each one of them in an intelligent manner.
- The capacity of causing the multiple electronic generators constituting the plant based on this controller to be grouped in such a way that said plant has the same external control variables and the same functionalities as an advanced synchronous generator with the power of the plant. The advanced auxiliary services that may be supplied by the resulting generation plant will facilitate its operational control by the TSO and shall provide differential characteristics that are not available in conventional distributed generation systems.

In order to achieve all of this, the controller of the invention comprises two main blocks referred to as: block 1 (electric block) (10) and block 2 (electromechanical block).

Block 1, or the electric block, comprises a control loop at which input the existing voltage difference between a virtual internal electromotive force and the voltage existing at the point of the grid to which it is connected, is injected. This voltage difference supplies a virtual admittance, which determines the current to be injected to the grid by the inverter.

The values of the parameters of this virtual admittance are dynamically adapted to the conditions of the grid. It also presents different behaviors for the different frequency and sequence ranges of the AC side. This way, the controller of the invention offers a different admittance for each frequency and each sequence, either direct, inverse, or homopolar. Therefore, the controller injects an elevated direct sequence current to the fundamental frequency of the grid, and to the other frequencies and sequences, including harmonics and transients, the controller injects the current that minimizes the potential existing perturbation.

Then, unlike the case of the study in the state of the art, block 1 works with current references, instead of with voltage references (synchronous generators work with voltage references for the induced electromotive force, and, in consequence, the conventional controllers emulating the same also work with voltage references) and with a virtual admittance, instead of working with a virtual impedance (in synchronous generators, the ratio between the induced electromotive force and the circulating current is determined by an impedance, and therefore, the conventional controllers emulating the same also base their operation on the existence of a virtual impedance).

Block 2, or the electromechanical block, unlike what is found in the state of the art, is not based on the imitation of the electromechanical characteristic of a synchronous generator, but it is configured as an adjustable power controller, which allows reaching an optimal response for the different power perturbations and fluctuations of the grid.

Therefore, this block 2 allows adjusting of the inertia and damping factor of the power control loop instantaneously, according to need at any time.

This block 2 is formed by a control loop comprising a PLC ("power loop controller") that receives, at the input, the difference between the input power (power delivered to the converter by the primary source) and the power delivered to the grid, as well as inertia references and damping factors, among others.

This block 2, or electromechanical characteristic controller, achieves flexibility for the set of the controller that allows, for example, reducing the inertia to facilitate the connection of the generator to the grid, or allocating higher inertias in the frequency ranges in which perturbations are desired to be eliminated.

The frequency of the virtual internal electromotive force is obtained at the output of the PLC, which is integrated to obtain the phase of the virtual internal electromotive force vector that ultimately determines a set of virtual tri-phase voltages. These virtual voltages supply the electric block, which is the one ultimately calculating the current reference to be injected to the grid to exchange a certain power with the same.

It should be noted at this point that the study of the state of the art about power converter controllers connected to the grid to regulate the active power exchanged with the same reveals that the inertia characteristic is not normally implemented in the same.

On the other hand, the references found that apply this concept are limited to the imitation of the electromechanical characteristic of the conventional synchronous generator, without introducing any type of improvement on said physical system. Thus, the synchronous power controller of the invention presents an evident difference with respect to the existing techniques, given that the inertia and the damping factor can be adjusted online and instantaneously according to the operating conditions.

On the other hand, the synchronous power controller of the invention uses different values, both for the virtual inertia and the damping factor, for different frequency ranges, which supposes important progress with respect to other existing techniques.

This way, the response of a generation plant based on this controller can be optimized for different frequency ranges by simply adjusting the inertia and damping factor references. Specifically, this type of controller contributes to the attenuation of power fluctuations, high-frequency harmonics, low-frequency fluctuations (grid modes), resonances, etc.

In summary, the set of the synchronous power controller of a generating system based on static power converters presented by the invention is composed of two fundamental blocks or controllers: the virtual electrical characteristic controller and the virtual electromechanical characteristic controller.

The electrical controller is supplied by the difference between the virtual internal electromotive force and the voltage at the connecting point of the grid and, by varying the parameters of the virtual admittance of the system according to the conditions of the grid at any given moment, the current to be delivered by the generation plant to the grid is determined.

The electromechanical controller is supplied by the difference between the input power into the converter and the power delivered to the grid and, by varying the parameters corresponding to inertia and the damping factor of the system according to the conditions of the grid at any given moment, the frequency of the virtual internal electromotive force to be generated and to be used in the electrical controller is determined.

The response of the controller of the invention presents a different dynamic behavior for the different frequency ranges of the grid.

With the foregoing, we are able to solve the interaction problems with the grid of power converter controllers connected to the grid that are found in the state of the art by means of the use of a more effective, dynamic, and flexible controller.

BRIEF DESCRIPTION OF THE DRAWINGS

With the purpose of facilitating the comprehension of the invention, several figures have been attached representing the following in an illustrative rather than limitative manner.

In said figures, the different references appearing therein have the following meanings:
(10) Block 1, electric block;
(11) Virtual electrical characteristic controller;
(12) Virtual admittance controller;
(13) Virtual admittance processor;
(14) Converter acting as a controlled current source;
(15) Electric grid;
(20) Block 2, electromechanical block;
(21) Virtual electromechanical characteristic controller;
(22) Inertia and damping factor controller;
(23) PLC ("Power Loop Controller");
(24) VCO ("Voltage Controller Oscillator").

DETAILED DESCRIPTION OF THE INVENTION

Figure 1:
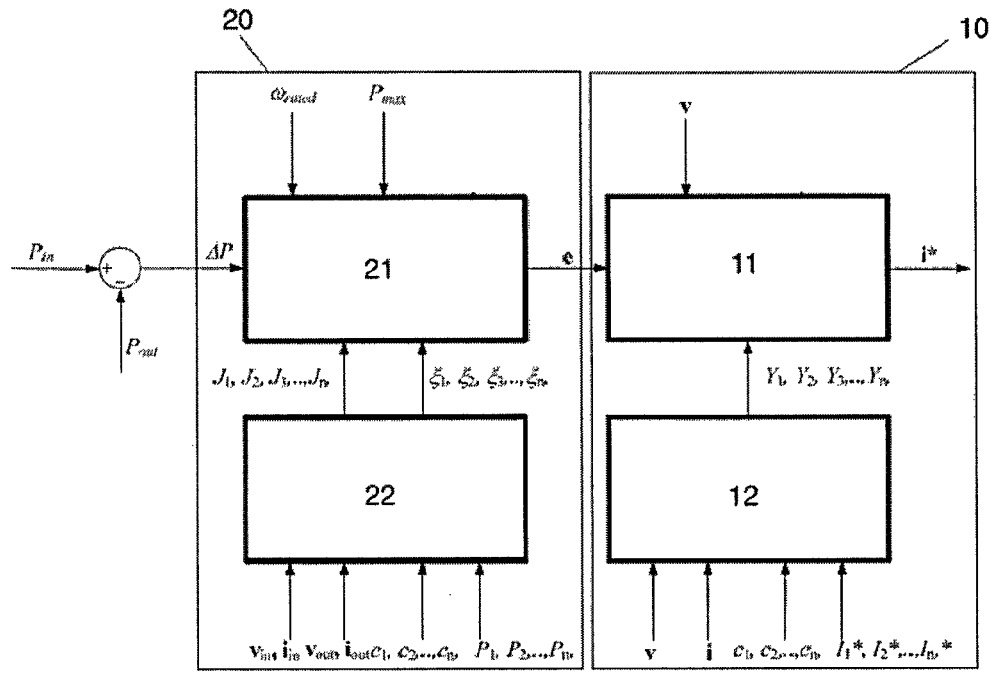
FIG. 1, general scheme of the controller of the invention.

In order to achieve a better comprehension of the invention, a detailed description thereof is made below based on the figures attached herein;

FIG. 1 shows the scheme representing the controller of the invention as a whole, formed by two main blocks: block 1 or the electric block (10), and block 2 or the electromechanical block (20).

Block 2 (20) in turn comprises the virtual electromechanical characteristic controller (21), as well as the inertia and damping factor controller (22), to which a series of variables of the system are introduced, such as input voltage ($v_{in}$), input current ($i_{in}$), output voltage ($v_{out}$), and output current ($i_{out}$), which are used selectively depending on the specific algorithm of the controller being applied. The inertia and damping factor controller (22) also receives a series of input parameters, such as the powers of reference ($P_1, P_2, \ldots, P_n$) and the adjustment constants of the response of the controller ($c_1, c_2 \ldots, c_n$) for each frequency range. Depending on the variables of the system and the adjustment parameters, the inertia ($J_1, J_2 \ldots, J_n$) and the damping factor values ($\xi_1, \xi_2, \ldots, \xi_n$) are obtained for each frequency at the outlet.

These inertia ($J_1, J_2 \ldots, J_n$) and damping factor values ($\xi_1, \xi_2, \ldots, \xi_n$) are introduced as parameters into the virtual electromechanical characteristic controller (21).

The virtual inertia and damping factor parameters are dynamically adapted to the operating conditions, offering a virtual inertia value ($J_1, J_2 \ldots, J_n$) and damping factor value ($\xi_1, \xi_2, \ldots, \xi_n$) for each frequency, such that establishing the capacity presented by the generator to attenuate different power oscillations existing in the grid (inter-plant, inter-area . . . ) and in the primary generation source (mechanical and structural resonances), is possible.

There are other auxiliary parameters supplied to this controller for the calculation of the tuning constants of the power loop controllers (PLC), such as the nominal frequency of the system ($\omega_{rated}$) and the maximum power supplied ($P_{max}$). The input variable of the virtual electromechanical characteristic controller (21) is the power difference ($\Delta P$) between the input power ($P_{in}$ input power into the converter) and the power delivered to the grid ($P_{out}$).

The virtual internal electromotive force (e), which is one of the input variables of block 1 or the electric block (10), is obtained from block 2 (20).

This electric block (10) also comprises two parts: the virtual electrical characteristic controller (11) and the virtual admittance controller (12). The input variables of the virtual admittance controller (12) are voltage (v) and current (i) of the grid and the DC bus, which are used selectively depending on the specific algorithm of the controller being applied. The parameters of the virtual admittance controller (12) are the values of the current of reference for each frequency and sequence ($I_1^*, I_2^*, \ldots, I_n^*$) and the adjustment constants of the response of the controller ($c_1, c_2, \ldots, c_n$) for each frequency range. Depending on these input variables and the adjustment parameters, this controller supplies the admittance value to be applied to each frequency and sequence ($Y_1, Y_2 \ldots, Y_n$).

The virtual electrical characteristic controller (11) receives the value of the virtual internal electromotive force (e), obtained from block 2 (20), and the voltage of the connecting point to the grid (v), as the input variables. Likewise, the virtual electrical characteristic controller (11) receives the virtual admittance values to be processed for each frequency and sequence of interest ($Y_1, Y_2 \ldots, Y_n$), which were calculated in the virtual admittance controller (12), as the input parameters. Based on these input variables and parameters, block 1 (10) supplies the value of the current of reference (i*) that must be injected to the electric grid (15) by the power converter acting as a controlled current source (14) at the output.

Figure 2:
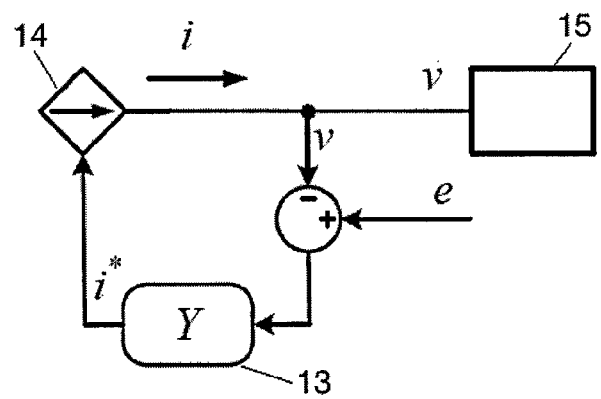
FIG. 2, control loop of block 1 or electric block.

FIG. 2 shows the control loop of block 1 (10) or electric block, at which input the voltage difference existing between a virtual internal electromotive force (e) and the voltage existing at the coupling point with the electric grid to which it is connected (v), is injected. This voltage difference supplies the virtual admittance processor (13), in charge of determining the current of reference (i*) to be injected to the grid (15) by the power converter.

Figure 3:
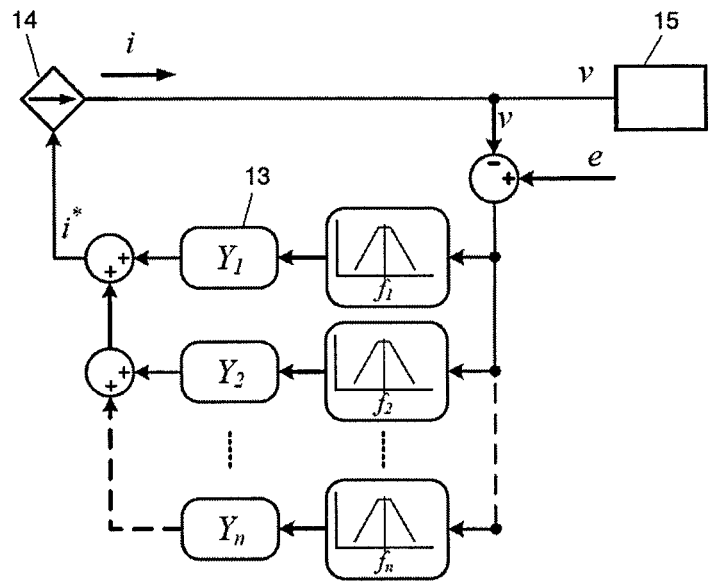
FIG. 3, operating scheme of block 1 with respect to different frequencies.

The parameters of this virtual admittance (13) are dynamically adapted to the conditions of the grid. As shown in FIG. 3, it also presents different behaviors for the different frequency ranges ($f_1, f_2, \ldots, f_n$) and input sequences, either direct, inverse, or homopolar. This way, the controller of the invention offers a different admittance ($Y_1, Y_2, \ldots, Y_n$) for each frequency ($f_1, f_2, \ldots, f_n$). In this sense, the controller injects an elevated direct sequence current to the fundamental frequency of the grid, and to the other frequencies and sequences, including harmonics and transients, the controller injects the current that minimizes the potential existing perturbation.

Therefore, unlike what was found in the study of the state of the art, block 1 works with current references, instead of working with voltage references (conventional synchronous generators, as well as the controllers intended to emulate them, work with voltage references) and with a virtual admittance, instead of working with a virtual impedance (which is a characteristic parameter of conventional synchronous generators, and therefore, of the controllers intended to emulate them).

Figure 4:
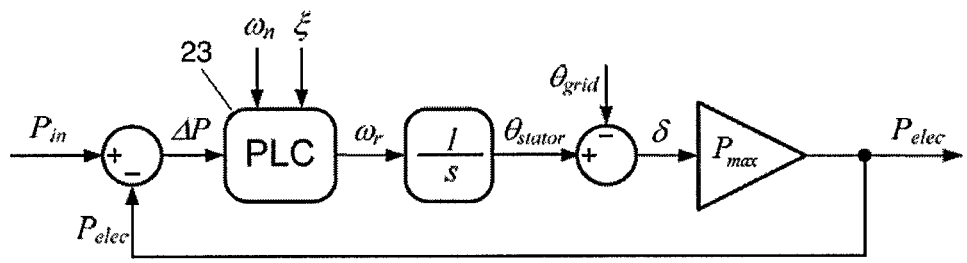
FIG. 4 control loop of block 2 or electromechanical block
FIG. 5, operating scheme of block 2 with respect to different frequencies.

FIG. 4 shows the general scheme of block 2 (20) or electromechanical block. This block 2 comprises a control loop regulated by a PLC (23) ("power loop controller"), which receives the power difference ($\Delta P$) existing between the input power ($P_{in}$) (power delivered to the converter by the primary source) and the power delivered to the grid ($P_{elec}$), as well as a series of parameters establishing the natural frequency and the damping factor ($\xi$) desired at any given time for the power loop controller. The frequency of the virtual internal electromotive force ($\omega_r$), which, once integrated, allows determining the phase ($\theta$) of the virtual internal voltages generated in the power converter, is obtained at the output of the PLC. Given that the values applied for the inertia and damping factor can be instantaneously modified for each frequency range, this block 2 or electromechanical block achieves flexibility for the set of the synchronous power controller. This flexibility allows, for example, making a fast connection from the generator to the grid by decreasing the inertia and subsequently increasing the value thereof for certain frequency ranges in which there can be grid perturbations that should not be followed by the generator.

The frequency of the virtual internal electromotive force is obtained at the output of the PLC, which is integrated to obtain the phase angle of the virtual internal electromotive force vector. With this phase angle and the value established for the virtual internal electromotive force module E*, a set of tri-phase voltages is obtained which constitute one of the input variables (e) of block 1 or electric block. After establishing the virtual internal voltage and its phase, the electric block will be in charge of transferring the grid powers by means of the injection of the corresponding current thereto.

Figure 5:
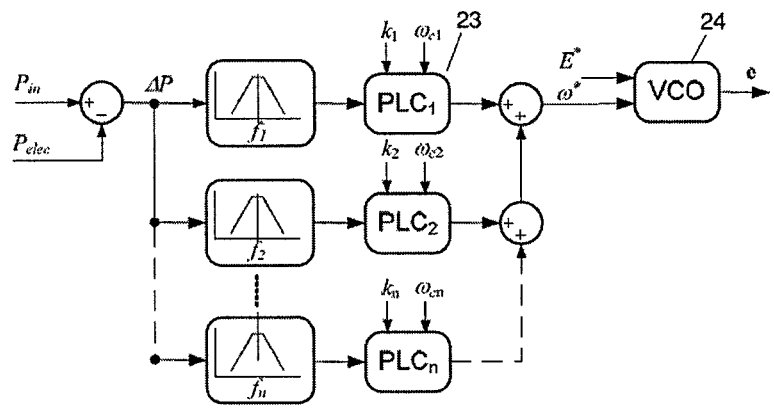

FIG. 5 shows the operation of block 2 for the different frequency ranges ($f_1, f_2, \ldots, f_n$). The sum of the output references of the PLC (23) are applied to the VCO (24), which generates a set of frequency voltages w* and amplitude voltages E*. Subsequently, these voltages are applied to one of the inputs of the virtual electrical characteristic controller (11).

The more direct application of the synchronous power controller of a generating system based on static power converters presented in this invention is in renewable energy plants (especially photovoltaic and wind), but its use in any other application requiring similar characteristics is not ruled out.

The invention claimed is:

1. A synchronous power controller of a generating system based on static power converters, for improving the integration of renewable energy plants to the electric grid, the synchronous power controller comprising:
   an electric block; and
   an electromechanical block;
   wherein the electromechanical block receives an indication of the power difference ($\Delta P$) existing between the input power into the converter ($P_{in}$) and the power delivered to the grid ($P_{out}$), and determines a virtual internal electromotive force (e),
   and wherein the electric block is configured to, based on the virtual internal electromotive force (e) from the electromechanical block, the voltage of the connecting point to the grid (v), and a virtual admittance (Y), determine the value of a current reference (i*) supplied to a converter acting as a controlled current source to be injected to the electric grid at the output of the electric block.

2. The synchronous power controller according to claim 1, wherein the electric block further comprises a virtual admittance controller configured to:
   receive input voltage (v) and current (i) signals of the grid and a DC bus and process the input voltage (v) and current (i) signals selectively according to a series of adjustment parameters ($c_1, c_2, \ldots, c_n$) and current reference values ($I_1^*, I_2^*, \ldots, I_n^*$) for each frequency range, and
   generate, based on the input voltage and current (i) signals, the adjustment parameters, and the current reference values, an admittance value ($Y_1, Y_2, \ldots Y_n$) to be applied to each frequency range.

3. The synchronous power controller according to claim 2, wherein the parameters of the virtual admittance (Y) are dynamically adapted to the conditions of the grid, offering a different admittance value ($Y_1, Y_2, \ldots Y_n$) for each frequency range ($f_1, f_2 \ldots f_n$), such that high currents can be injected to the fundamental frequency of the grid; and the necessary currents minimizing potential perturbations are injected to the other frequencies, transients, and imbalances.

4. The synchronous power controller according to claim 1, wherein the electric block further comprises a virtual electrical characteristic controller configured to:
  receive as input signals the virtual internal electromotive force (e) obtained from the electromechanical block, the voltage of the connecting point to the grid (v), and virtual admittance values for each frequency ($Y_1, Y_2, \ldots Y_n$), obtained from the virtual admittance controller, and
  generate, based on the received input signals, the value of the current of reference (i*).

5. The synchronous power controller according to claim 1, wherein the electromechanical block further comprises an inertia and damping factor controller configured to:
  receive as input signals input voltage ($v_{in}$), input current ($i_{in}$), output voltage ($V_{out}$), and output current ($i_{out}$) signals and process them selectively according to a series of adjustment parameters ($c_1, c_2 \ldots, c_n$) and powers of reference ($P_1, P_2 \ldots, P_n$) for each frequency range, and
  generate, based on the input signals, virtual inertia ($J_1, J_2, \ldots J_n$) and damping factor values ($\xi_1, \xi_2, \ldots, \xi_n$) for each frequency range.

6. The synchronous power controller according to claim 5, wherein the virtual inertia and damping factor parameters are dynamically adapted to the operating conditions, offering a virtual inertia ($J_1, J_2, \ldots, J_n$) and damping factor ($\xi_1, \xi_2, \ldots, \xi_n$) value for each frequency range, to attenuate different power oscillations existing in the grid and in the primary generation source.

7. The synchronous power controller according to claim 1, wherein the electromechanical block further comprises a virtual electromechanical characteristic controller configured to:
  receive as input signals the indication of the power difference ($\Delta P$) existing between the input power into the converter ($P_{in}$) and the power delivered to the grid ($P_{out}$), virtual inertia ($J_1, J_2, \ldots, J_n$) and damping factor values ($\xi_1, \xi_2, \ldots, \xi_n$) for each frequency range and a series of auxiliary parameters including the nominal frequency of the system ($\omega_{rated}$) and the maximum power supplied ($P_{max}$), and
  generate, based on the received input signals, the virtual internal electromotive force (e) applied to one of the inputs of the electric block.

8. The synchronous power controller according to claim 1, wherein the electric block comprises a control loop regulated by a power loop controller (PLC), which receives the indication of the power difference ($\Delta P$) existing between the input power into the converter ($P_{in}$) and the power delivered to the grid ($P_{out}$), as well as virtual inertia ($J_1, J_2, \ldots J_n$) and damping factor ($\xi_1, \xi_2, \ldots, \xi_n$) values for each frequency range ($f_1, f_2, \ldots, f_n$), and wherein the sum of the output references of the PLC is supplied to a Voltage Controller Oscillator (VCO) generating a set of frequency voltages w* and amplitude voltages E* constituting the virtual internal electromotive force (e), subsequently applied to one of the inputs of the electric block.

* * * * *